(12) United States Patent
Deber et al.

(10) Patent No.: US 10,216,602 B2
(45) Date of Patent: Feb. 26, 2019

(54) TOOL TO MEASURE THE LATENCY OF TOUCHSCREEN DEVICES

(71) Applicant: Tactual Labs Co., New York, NY (US)

(72) Inventors: Jonathan Deber, Toronto (CA); Bruno Rodrigues De Araujo, Toronto (CA); Ricardo Jorge Jota Costa, Toronto (CA); Clifton Forlines, South Portland, ME (US); Darren Leigh, Round Hill, VA (US); Steven Leonard Sanders, New York, NY (US); Daniel Wigdor, Toronto (CA)

(73) Assignee: Tactual Labs Co., New York, NY (US)

( * ) Notice: Subject to any disclaimer, the term of this patent is extended or adjusted under 35 U.S.C. 154(b) by 99 days.

(21) Appl. No.: 15/276,351

(22) Filed: Sep. 26, 2016

(65) Prior Publication Data
US 2017/0132105 A1    May 11, 2017

Related U.S. Application Data

(60) Provisional application No. 62/233,064, filed on Sep. 25, 2015.

(51) Int. Cl.
*G01P 3/66* (2006.01)
*G06F 11/30* (2006.01)
(Continued)

(52) U.S. Cl.
CPC .......... *G06F 11/3041* (2013.01); *G06F 3/044* (2013.01); *G06F 3/0418* (2013.01); *G06F 11/2221* (2013.01); *G06F 11/3419* (2013.01)

(58) Field of Classification Search
CPC ...... G06F 11/30; G06F 11/34; G06F 11/3041; G06F 3/0418; G06F 3/044; G06F 3/041; G06F 11/3419
See application file for complete search history.

(56) References Cited

U.S. PATENT DOCUMENTS

| 2004/0021623 A1* | 2/2004 | Nicolas | G09G 3/22 345/74.1 |
| 2006/0038581 A1* | 2/2006 | Kanai | G01N 21/95 324/760.01 |

(Continued)

*Primary Examiner* — Thang X Le
(74) *Attorney, Agent, or Firm* — Adam Landa

(57) ABSTRACT

In an embodiment, a latency measuring head is provided for use in measuring touch-to-response latency in a test device, the test device including a capacitive user interface that responds to touch input. The latency measuring head includes a conductive element adapted to be positioned in static proximity with and/or in contact with the capacitive user interface. An electron sink is operatively connected to the conductive element via a normally open switch having an open and a closed position. The electron sink has capacity to hold or dissipate a sufficient charge to trigger a touch event on the test device when the switch is closed. A photosensitive element is positioned in static proximity with and/or in contact with the capacitive user interface such that the photosensitive element can output a signal in response to a change in an optical property of at least a portion of the capacitive user interface. Software for performing analysis of latency measurements from a latency measuring device and generating statistics that summarize latency performance of a test device is further disclosed.

37 Claims, 3 Drawing Sheets

(51) Int. Cl.
*G06F 3/044* (2006.01)
*G06F 3/041* (2006.01)
*G06F 11/34* (2006.01)
*G06F 11/22* (2006.01)

(56) References Cited

U.S. PATENT DOCUMENTS

| | | | |
|---|---|---|---|
| 2006/0145087 A1* | 7/2006 | Parker | H01J 9/42 250/396 R |
| 2010/0218204 A1* | 8/2010 | Shimizu | G01J 1/46 720/621 |
| 2013/0241479 A1* | 9/2013 | Wright, Jr. | H02H 5/10 320/109 |
| 2017/0214878 A1* | 7/2017 | Van Der Tempel | H04N 5/3559 |

* cited by examiner

|  | | Main Cluster | | | Secondary Cluster | | | Diff. from Baseline |
|---|---|---|---|---|---|---|---|---|
|  | | Latency (ms) | SD (ms) | Cluster Size | Latency (ms) | SD (ms) | Cluster Size | |
| iPad mini | Baseline | 54.42 | 0.55 | 164 | - | - | - | - |
|  | +50 ms | 103.7 | 1.09 | 158 | 120.3 | 0.91 | 34 | 49.3 |
|  | +100 ms | 153.7 | 1.06 | 161 | 170 | 0.33 | 30 | 99.27 |
|  | Baseline | 73.22 | 0.3 | 176 | - | - | - | - |
|  | +1 frame | 89.92 | 0.41 | 130 | 103.3 | 1.35 | 36 | 16.7 |
|  | +2 frames | 105.9 | | | 122.4 | | | |

| Device | Main Cluster | | | Secondary Cluster | | |
| --- | --- | --- | --- | --- | --- | --- |
| | Latency (ms) | SD (ms) | Cluster Size | Latency (ms) | SD (ms) | Cluster Size |
| Nexus 6 (Android 5.1.1) | 92.35 | 1.28 | 392 | 78.33 | 1.5 | 82 |
| iPhone 6 (iOS 8.4.1) | 52.35 | 1.33 | 455 | – | – | – |
| Nexus 9 (Android 5.1.1) | 87.19 | 0.77 | 253 | 70.66 | 1.27 | 226 |
| Surface Pro 3 (Windows 10) | 69.53 | 1.76 | 354 | 101.7 | 1.07 | 70 |

TOOL TO MEASURE THE LATENCY OF TOUCHSCREEN DEVICES

This application is a non-provisional of, and claims priority to, U.S. Provisional Patent Application No. 62/233,064 filed Sep. 25, 2015, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of touchscreen devices, and in particular to latency measuring tools for measuring latency in capacitive touchscreens.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

DETAILED DESCRIPTION

In an embodiment, a latency measuring head is provided for use in measuring touch-to-response latency in a test device, the test device including a capacitive user interface that responds to touch input. In an embodiment, the latency measuring head includes a conductive element adapted to be positioned in static (i.e., at a fixed distance) proximity with and/or in contact with the capacitive user interface. In an embodiment, an electron sink is operatively connected to the conductive element via a normally open switch having an open and a closed position. In an embodiment, the electron sink has capacity to hold or is adapted to dissipate a sufficient charge to trigger a touch event on the test device when the switch is closed. In an embodiment, a photosensitive element is positioned in stationary (i.e., at a fixed distance) proximity with and/or in contact with the capacitive user interface such that the photosensitive element can detect, and output a signal in response to a change in an optical property of at least a portion of the capacitive user interface.

In an embodiment, a latency measuring device as disclosed herein provides a cost-effective yet high-accuracy and high-precision automated tool that measures the interface latency of touchscreen devices. The device can directly measure latency by triggering a capacitive touch event on a test device using an electrically actuated touch simulator along with a photosensitive element to monitor the screen for a visual response. This allows measurement of full end-to-end latency of a touchscreen system exactly as it would be experienced by a user. In an embodiment, the latency measuring device can be configured so that it does not require human interaction to perform a measurement, thus, enabling the acquisition of large datasets. Also disclosed are a series of tools and equipment to assess and validate the performance of the latency measuring device, and demonstrate that it can provide reliable latency measurements.

Figure 1:
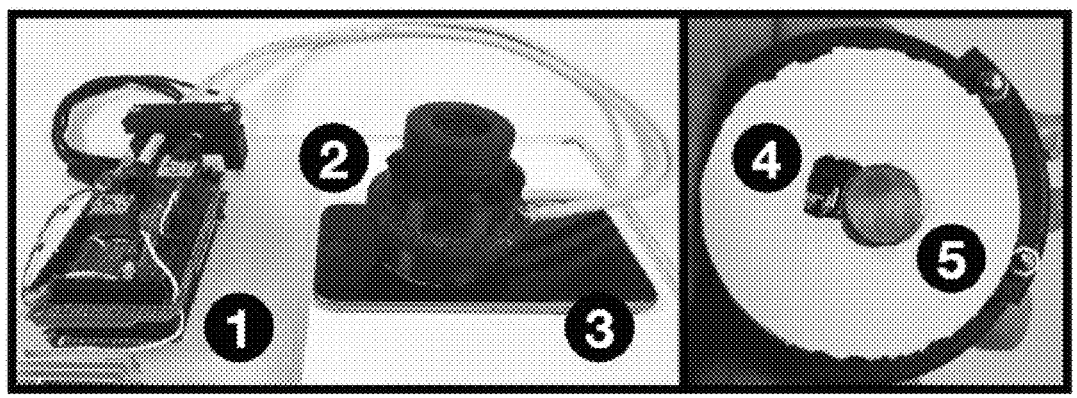
FIG. 1 is a perspective view (left) and a bottom view (right) illustrating an embodiment of a disclosed latency measuring device.

With reference to FIG. 1, in an embodiment, the disclosed latency measuring device comprises a microcontroller 1 and a measurement head 2 that rests on a device under test 3. The measurement head 2 includes a photosensitive element 4 to measure display an optical property and a conductive element 5 to trigger touches on capacitive screen. The photosensitive element 4 may be, for example, a photodiode, a camera, a photoresistor, a phototransistor, a CCD, or a CMOS. As would be understood by one of ordinary skill in the art in view of this disclosure, the aforementioned list of potential photosensitive elements is not exhaustive and is not limited solely to the items listed in the aforementioned example. In an embodiment, an optical property can be used as one basis of measurement. The optical property may be brightness, contrast, color, luminance, or other optical property. In an embodiment, the conductive element 5 is a brass contact. In an embodiment, the conductive element comprises any conductive material, including but not limited to brass, aluminum, bronze, iron, steel, nickel, tin, silver, gold, platinum, carbon, conductive plastics, indium tin oxide, or any material with a high dielectric. As would be understood by one of ordinary skill in the art in view of this disclosure, the aforementioned list of conductive materials for the conductive element is not exhaustive and is not limited to only those materials listed in the aforementioned example. In an embodiment, a goal of the latency measuring device is to provide a reliable apparatus to accurately measure end-to-end interface latency on touchscreen devices. This means estimating the time from touch activation to the display of the corresponding visual response. This interval is caused by both software and hardware components. Such software and hardware components include components along the following flow of events: the capacitive touch sensor of the test device detects the touch; the touch information is captured by the hardware and processed by the operating system; a message is passed to the active application; the application updates its internal state and draws new information to a display buffer; the display buffer is passed to the operating system; the operating system asks the display to render the display buffer; the display updates its pixels, and is able to finally show the user the feedback for the touch activation. Within this flow, each step contributes to the final end-to-end latency. (In an embodiment, as discussed in more detail below, a goal of the latency measuring device is to provide a reliable apparatus to accurately measure component parts of the end-to-end interface latency on touchscreen devices.)

Latency is not constant and may depend on numerous factors, thus, some variability is to be expected. While the input sensor and the display are scanned and updated cyclically (typically between 60 and 120 Hz, with constant data transfer costs), the touch sensing is not always synchronized with the finger landing on the display surface. In addition, system load is not always consistent, and the display is not always ready to render when a buffer swap is requested. Moreover, latency is strongly connected to the display refresh rate. On a 60 Hz display, new frames may be displayed every 16.7 ms. Minor improvements in latency may be absorbed by the refresh rate and large increases in latency may suddenly occur if a small additional delay forces the graphical update to wait for the next display frame.

Although latency measurements can be based on timestamp information internal to a device, both software and hardware factors affecting performance suggest that the most accurate measurement of latency is usually taken by 1) optically observing the screen's response to a physical input, and 2) running a series of trials to cope with measurement variations, as described above. The present disclosure focuses on a device that measures end-to-end latency—from activation to observable visual response—and that may automate multiple measurement cycles, thereby reducing human intervention (e.g., only required for initial setup for the measurement session).

An example of use and operation of the presently disclosed latency measuring device is as follows. In an embodiment, the latency measuring device is placed on top of a touchscreen device running an application that responds to a touch event by causing a significant change in an optical property, such as brightness. In an embodiment, prior to each measurement session, the latency measuring device measures the light levels associated with the bright "on" and dark "off" states of the screen and calibrates brightness thresholds for each state. A host computer controls the latency measuring device, and an operator can initiate multiple runs of unattended measurements. The latency measurements are automatically clustered and analyzed; the results are provided to the operator in both graphical and textual formats.

In an embodiment, when a measurement cycle is initiated, the latency measuring device records a timestamp and uses a touch simulator to trigger the capacitive screen and generate a touch event. This may be entirely automated and does not require human interaction, except e.g., to initiate the sequence. In an embodiment, from the touchscreen's point of view, the simulated touch is perceived as a human touch on the screen. In an embodiment, the simulated touch is indistinguishable from a human touch. After initiating the touch, the latency measuring device uses a photosensitive element such as a photo sensor or photodiode to watch for the change in an optical property (e.g., screen brightness, contrast, color, or luminance) caused by the response to the touch. Once a change in optical property is observed, the latency measuring device records a second timestamp. The elapsed time between the timestamps constitutes a single latency measurement. The automated nature of the latency measuring device means that hundreds of measurements can easily be collected when evaluating a device. In an embodiment, the value of the first timestamp is associated with the time of triggering, and the second timestamp is associated with the time the measurable change in optical properties occurs. In an embodiment, the first and/or second timestamp may be adjusted for latency or lag between the recording of a timestamp and the events with which a timestamp is associated.

In an embodiment, a custom application is used in order to ensure maximum, predetermined or otherwise quantifiable changes in optical property (e.g., brightness, contrast, color, or luminance). In an embodiment, the custom application may, for example, draw a black screen and then draw a white region in response to a touch event. However, in an embodiment, it is possible to use any change in interface brightness (e.g., a button activation highlight) at the cost of some sensitivity. This allows measurement of the latency of commercial applications that do not permit third-party code and/or on devices that do not permit third-party code. It also allows measurement of the latency of commercial applications and/or devices without the use of third-party code. In an embodiment, an application running on the test device can be configured to output other types of responses from the device in addition to screen response. Such other types of response include, e.g., electrical, acoustic, and tactile responses.

In an embodiment, the latency measuring device has no moving parts in the touch simulator. Design challenges associated with a latency measuring device having no moving parts are detailed below. In an embodiment, solving the design challenges allows reproducibility and the ability to precisely trigger touch events without human intervention. In an embodiment, removing the human element from the measurement process enabled automation, which is a significant contribution to the latency measuring device.

Figure 2:
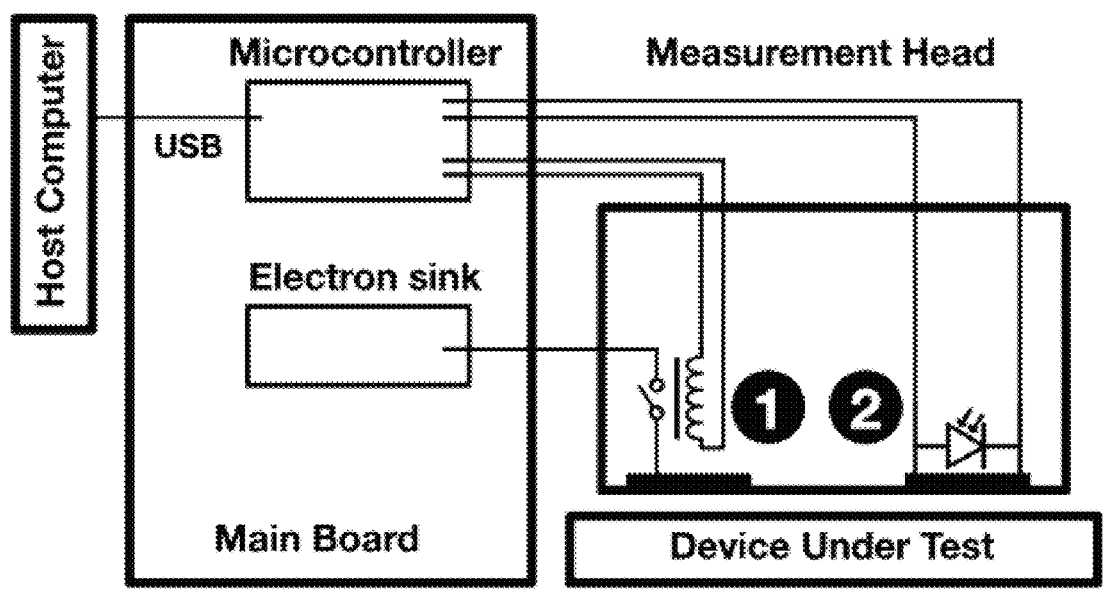
FIG. 2 is a block diagram illustrating an embodiment of a disclosed latency measuring device.

FIG. 2 shows a block diagram illustrating main components of the latency measuring device in accordance with an embodiment. The main board triggers a touch by closing the switch 1 to generate a capacitive disturbance on the screen. The visual response is monitored by the photosensitive element 2 connected to the microcontroller. In an embodiment, the computed latency is then output to the host computer. In an embodiment, a time associated with the switch closing and a time associated with a responsive change are then output to a host computer. In an embodiment, the measurement head contains the touch actuator (using a conductive element such as a brass contact approximately the size of a human finger tip) and photosensitive element. When positioned on top of a touchscreen, the conductive element is designed so that it will not trigger a touch by itself. However, in an embodiment, the conductive element is electrically connected to an electron sink (e.g., an electron sink that provides additional mass and/or surface area), and thus triggers a touch event. In an embodiment, an electronically actuated normally open (NO) switch controls this connection. When the switch is closed, the conductive element is connected to the electron sink, disturbing the capacitive levels on the touchscreen and triggering a touch event.

Implementing the latency measuring device may involve providing solutions for one or more of the steps defined in the previous section: generating a touch event, capturing feedback from the display, and accurately calculating the time between the two events. Moreover, there are some practical considerations (e.g., holding the latency measuring device to the device under test) that influence the design.

In the following examples of the implementation of an embodiment of a latency measuring device, we begin with a discussion of the measurement head, which, in this embodiment, is responsible for generating touches and sensing the screen's response, and then proceed with a discussion of the main board, which houses the microcontroller. As would be understood by one of ordinary skill in the art in view of this disclosure, the main board, microprocessor, and other components described herein may be separate from or integral with the measurement head depending upon the particular application without departing from the spirit and scope of the invention.

Measurement Head

In an embodiment, the measurement head is a roughly cylindrical enclosure that includes the circuitry to generate the simulated touch and deliver it to the screen through a conductive element (e.g., a brass contact) as well as a photosensitive element to sense feedback (See FIG. 1, right). Such enclosure may be custom 3D printed or mass manufactured. In an illustrative embodiment, the conductive element and photosensitive element (e.g., photodiode, camera, photoresistor, phototransistor, CCD, or CMOS) protrude through a hole in the bottom of the head, and rest on the screen during testing. In an illustrative embodiment, the remainder of the bottom surface is covered in a layer of EPDM rubber (or a similar substance) to allow the head to grip the screen. In an illustrative embodiment, a small circuit board is mounted inside the head and contains the switch (and supporting circuitry) that generates the touch; this switch is discussed in detail in the following section. In an illustrative embodiment, the top of the head is covered in Velcro hook-and-loop fastener, which enables repositionable weights that aid the positioning of the measurement head such that it remains flat on the screen. As described below, two main functions of the measurement head are generating touch and sensing feedback.

Generating Touch

One goal of a latency measuring device is to reduce the introduction of human-induced errors during measurement. To effectively remove human interaction from the measurement loop (e.g., to reduce the introduction of human-induced errors), the latency measuring device can create a simulated touch that is indistinguishable from an actual human touch. In order to do this, the latency measuring device generates a change in the screen capacitance that the sensor identifies as a touch, and, in an embodiment, it is able to programmatically trigger and reverse this change.

In an embodiment, to generate changes in capacitance, the conductive element is connected to an electron sink. Brass may be selected as the material for the conductive element because it is highly conductive, corrosion resistant, and relatively soft (as compared to other metals) reducing the likelihood of screen damage due to scratches; it is also relatively lightweight, which reduces the likelihood of screen damage due to impacts. In an illustrative embodiment, the conductive element is 12 mm in diameter (similar to a fingertip) and 2 mm tall. Design parameters for the conductive element are quite flexible but, in an embodiment, care must be taken to design the element does not trigger a touch event on its own. In an embodiment, the conductive element has a small enough surface area so that the element does not trigger a touch event on its own. In an illustrative embodiment, the inside of the conductive element (i.e., the side that is facing into the measurement head enclosure) was coated in liquid rubber insulation.

In an embodiment, the conductive element is connected to an electron sink in order to dissipate additional charge, nonetheless, unintentional dissipation is avoided. In an illustrative embodiment, connecting the conductive element to one end of a 30 cm 22 AWG wire with alligator clips (leaving the other end of the wire disconnected) was sufficient to induce a touch event. In an embodiment a small bare aluminum heat sink (Ohmite R2V-CT6-38E) is employed.

As will be apparent to a person of skill in the art in view of this disclosure, the characteristics of the aluminum heat sink (conductive material arranged to maximize its surface area) are consistent with the design requirements of an electron sink as required herein. In an embodiment, connecting the contact to the electron sink permitted touch to be reliably triggered. In an embodiment, as discussed in more detail below, the touch triggering is programmatically enabled and disabled by the connection and disconnection of the electron sink and the conductive element.

Triggering touch programmatically: A very small change in capacitance (on the order of 1 pF) is needed to register a touch event on a capacitance sensor. Accordingly, in an embodiment, a switch with highly insulated mechanical relay is used. In an embodiment, although it is electrically actuated, the switch selected must have very small leakage because, as will be apparent to a person of skill in the art in view of this disclosure, a very small change in capacitance can trigger the touch response. The leakage in many switches result in a touch event as soon as the latency measuring device comes in contact with the screen, regardless of the switch position. During the development process numerous alternatives were examined and tested, including solid-state analog switches, tri-state devices, transistors, solid-state relays, and mechanical relays. In an embodiment, acceptable performance was observed using an Omron G6J-2P-Y, a highly insulated mechanical relay. In an embodiment, a low leakage switch, along with such careful hardware design as will be apparent to a person of skill in the art in view of this disclosure, can mitigate and/or eliminate erroneous touch events. In an embodiment, a transistor, diode, an analog switch, a MEMS switch, or any low-capacitance switch may be used to electrically connect and disconnect the electron sink from the conductive element.

As will be apparent to a person of skill in the art, a reliance on a mechanical switch may introduce problems. For example, switching a mechanical relay involves energizing a coil to magnetically move a metal contact, and such a movement (e.g., in the macroscopic world) takes far longer—on the order of several milliseconds—than the sub-atomic equivalent in a solid-state switch. While one could potentially ignore a few nanoseconds of solid-state switching time, millisecond-scale switching times cannot be ignored when taking millisecond-scale latency measurements. As a result, in an embodiment, a double pole relay with two switches controlled by a single coil was used: one pole was used to switch the touch simulator, and the other pole was fed into an input pin on the microcontroller. In such configuration, a change on that input pin indicated that the relay had closed, allowing the system to account for the relay's switching time (e.g., removing or subtracting it from the latency measurement). Depending on a selected switch, the bounce associated with the closure of a mechanical switch could be of concern because physical contacts can vibrate and cause a short period of rapid oscillations when a switch closes. In an illustrative embodiment, bounce was measured with an oscilloscope over a dataset of 50 relay closings, and an average bounce time of 0.118 ms (SD=0.003) was determined. In an embodiment, where bounce time is low, it can be ignored. In an embodiment, bounce time must be accounted for in the system. As would be understood by one of ordinary skill in the art in view of this disclosure, any type of switch that functions with the circuitry disclosed herein may be implemented, without departing from the scope and spirit of the disclosure herein.

As will be apparent to one of skill in the art in view of this disclosure, when designing the circuitry to trigger touch, attention is paid to minimize current leakage and stray capacitance, since these could otherwise trigger unintended touches. In an embodiment, a relay is acting as a switch between the conductive element (which is always resting on or in close proximity to the screen) and the electron sink, one half of the switch will always be "connected" to the conductive element, regardless of the switch position. In an embodiment, the length of the connection between the switch and the conductive element is minimized. In an embodiment, the length of the connection between the switch and the conductive element is selected to avoid accidental or unintended touch. In an embodiment, a relay is placed in close proximity to the conductive element in the measurement head. In an embodiment, a relay is placed as close as possible to the conductive element in the measurement head. In an embodiment, a small circuit board is used inside the head to allow the relay to be placed in close proximity to the conductive element.

Sensing Feedback

In an embodiment, to compute a test device's latency, the latency measuring device identifies feedback generated by the simulated touch. Screen response can be identified as a change in optical property. In an embodiment, screen response to touch is a change from a black screen to a white one. In an embodiment, a Vishay BPW46 PIN photodiode can be used to identify changes in brightness. The Vishay BPW46 PIN photodiode has a fast and consistent response time, a flat-sided package that can sit flush against the screen, and good visible light sensitivity.

In an embodiment, the photosensitive element can be mounted in the measurement head adjacent to the conductive element, which allows it to observe a response in close proximity to the touch event and is connected to an ADC (analog-to-digital converter) in the microcontroller via a shielded cable to the main board.

In an embodiment, a raw analog signal is transmitted over the cable. A raw analog signal may be sensitive to noise. In an embodiment, no active circuitry is located adjacent to the photosensitive element in the measurement head. In an embodiment, a high-speed ADC is located in the measurement head to allows transmission of a digital signal from the measurement head to the main board, making the signal more resilient to noise. In an embodiment, noise may be mitigated by shielding. In an embodiment, the effect of noise may be mitigated in software (e.g., detecting and rejecting anomalous readings or measurements from the photosensitive device (e.g., the photodiode) or anomalous measurements based on such anomalous readings or measurements.

Main Board

With the conductive element and photosensitive element in place, the main board is next described. In an embodiment, the main board contains the microcontroller and supporting circuitry; it is responsible for triggering the switch to generate a touch, and then sensing the photosensitive element for changes in the optical property being sensed. In an embodiment, when a change in optical property is detected, the latency measuring device can calculate the time difference and output a latency measurement. In an embodiment, the latency measuring device can output time measurements of starting and ending events instead of, or in addition to the time difference or latency measurement. As noted above, the main board, microprocessor, and other components described herein may be separate from or integral with the measurement head depending upon the particular application.

In an embodiment, the logic and computing functions of the latency measuring device are provided by a microcontroller board. Examples of suitable microcontroller boards include, e.g., the Arduino Due microcontroller board, which is based on an Atmel SAM3X8E ARM Cortex-M3 CPU running at 84 MHz. In addition to the digital I/O pins, the latency measuring device can make use of one of the built-in 12-bit ADCs to read the photodiode light levels. The customized supporting circuitry for the latency measuring device is built on a protoshield, which provides 30 cm$^2$ of perfboard in an Arduino-compatible form factor. In an embodiment, the measurement head is connected to the main board via a pair of shielded Category 6 STP cables (i.e., Ethernet cable and connectors). The cables do not carry an Ethernet signal; rather, they are simply readily available shielded multi-conductor cables with built-in connectors. In an embodiment, the latency measuring device may send measurements or components of the measurement (e.g., timestamps) to the host computer, and these measurements or components of the measurement may be logged/aggregated by the host. In an embodiment, the latency measuring device itself may aggregate a plurality of measurements or components of the measurement (e.g., timestamps). Examples of software for a microcontroller that may be used in connection with the above-defined measurement apparatus, and a host computer that may be used in connection with the above-defined measurement apparatus, as well as device-specific helper applications are described in the next section.

Latency Measuring Device Software

In an embodiment, several software components are required to perform a latency measurement. The main responsibility of the software is to coordinate the events defined in the previous sections and to store that information in the host computer for later analysis. For convenience herein, software is divided in two main components: firmware and host computer software, although it will be apparent to one of skill in the art in view of this disclosure that the activities of either may be supplanted, or supplemented, by the other, or by software running on additional or different hardware. In an embodiment, software that runs on the device under test is provided. The practitioner can provide "white touch" applications for several platforms that draw a black screen and then respond to a touch event by drawing a white region, but any application which causes a change in optical property, such as a brightness change at (or in the vicinity of) the point of a touch (or at another location), will suffice.

In an embodiment, the latency measuring device may be configured to measure end-to-middle, middle-to-middle and middle-to-end latency in addition to, or in lieu of end-to-end latency. In accordance with such embodiment, the latency measuring device breaks down individual parts of the test device's performance. For example, the test device can be configured with software to output an electrical signal when it has identified a touch but before it has fully processed it. In an embodiment, in response to that signal, and the latency measuring device can be configured to record three timestamps: the onset of touch (as before), the time it received a signal indicating touch capture (new), and the display response (as before). In an embodiment, many such signals are output, and allowing the latency measuring device to produce a finer grained picture (e.g., one or more middle-to-middle latency measurements) of where the device latency originates from since intermediate timestamps can be assigned to individual components of the device's response.

In another embodiment, the latency measuring device and the device under test synchronize a clock. Using their common clocks, the two devices record timestamps associated with a variety of events. Thus, instead of outputting a signal during the test, the device under test may report recorded information that occurred during the test. The recorded clock information from one or both devices is then used to determine point-to-point latency between any two events for which clock information has been recorded.

Firmware

In an embodiment, firmware is responsible for the low-level actions involved in running a latency measurement and for transmitting the results back to the host computer. It can also run a series of precisely spaced measurements, which is used by the host software to create extended latency datasets; the data flow is described in the following section. Finally, the firmware may also be responsible for maintaining a calibration of brightness levels (or other optical property levels) of the "on" and "off" touch states. In an illustrative embodiment, firmware is written in an Arduino variant of C, and interacts with the host computer via a USB-based serial console. In an embodiment, the protocol is human-readable to facilitate easy debugging operations.

Host Computer Software

In an embodiment, host software is the front end of the latency measuring device. In an illustrative embodiment, it is an interactive command line application written in Python that sends commands to the firmware, receives and analyses the results, and outputs data files and charts to the user.

Dataflow

A sample dataflow of an illustrative system for latency measurement is as follows: The user places the latency measuring device on the screen of the device under test, and indicates the desired number of series to run, each of which consists of 10 measurements. Extended testing could use 100 series (for a total of 1000 measurements), but a small number of series (e.g., 5) may yield a good overview of the device's latency. The host software instructs the firmware to calibrate the "on" and "off" light levels and then begins running the first series of tests. Between each series, a randomized delay between 0-16.7 ms is communicated to the latency measuring device in order to distribute the measurements across the screen's refresh cycle. When all series are complete, the user is alerted, and results are shown on-screen. During the capture of latency measurements, user interaction is only required if the latency measuring device has detected a malfunction (e.g., a human is required to push a power button to wake the device). Once all of the data is collected, the host software runs a k-means clustering algorithm across all of the measurements from all of the series. This is done because groupings based on the display refresh cycle are expected. The output data typically cluster around multiples of display refresh times. The raw and clustered data is then logged, and a visual representation of the observed latencies is displayed. Raw data is also made available to the user for logging or further analysis.

Figures 3, 4:
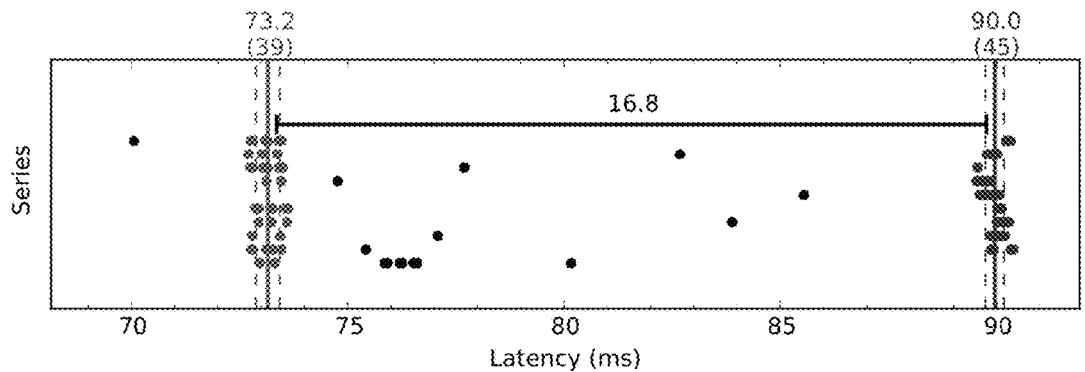
FIG. 3 shows a chart illustrating raw and clustered latency data.
FIG. 4 shows a table illustrating software delay validation results.

A sample chart illustrating output from the above sample dataflow is shown in FIG. 3. In particular, FIG. 3 shows a graphical summary generated by an embodiment of the disclosed latency measuring tool showing 100 latency measurements of a Google Nexus 9 tablet. The dataset contains 10 series, each of which contains 10 measurements. Each row corresponds to one series. Measurements are clustered into two groups, with means spaced one display frame (16.8 ms) apart, illustrating the variability of the device's latency.

Validation

The development of any type of test equipment requires a careful and thorough validation process to ensure that the equipment is, in fact, measuring reality. In many cases it is possible to verify new test equipment against an existing gold standard or test regime, providing a chain of metrological traceability. However, there is no standard or regime for latency measurement devices. Disclosed herein is a series of tests and test equipment to provide confidence that the latency measuring device is correctly measuring latency.

The first test measures relative latency by intentionally adding latency to a device and checking that the latency measuring device is able to detect it. The second test measures the overhead involved in a latency measuring device measurement by creating and measuring a zero-latency device. The third test seeks to validate the absolute accuracy and repeatability by creating a simple oscillator-based latency generator circuit and simultaneously measuring it with the latency measuring device and with an oscilloscope. The fourth and final test cross-validates the latency measuring device by building a camera-based apparatus and simultaneously measuring a real device with both the camera and the latency measuring device.

Software Delay Test

Two variants of the above-referenced "white touch" applications were created (running on iOS and Android, respectively) that added an arbitrary delay prior to drawing the white region in response to a touch. Each application added this delay with a different programmatic mechanism. As a first measurement of the device's accuracy, the added latency is measured. This allows verification of the relative measurement of performance of the latency measuring device (e.g., configurations A and B are 50 ms apart) independent of the latency measuring device's absolute measurement performance (e.g., configuration A has 100 ms of latency).

The first version introduces milliseconds of latency (using $POSIX_{usleep}$). Several series of latency measurements were run using different added latencies using an iPad mini running iOS 7.1.2. The second application delays the response by a certain number of display frames, rather than by a certain number of ms. By doing so it was possible to take into account the device's limitation in rendering to the display and measure latency in display frames. To add additional robustness to the verification, Android was used for this test, and Android's Choreographer was used to schedule the screen update in the future. Tests were performed on a Nexus 9 running Android 5.1.1. FIG. 4 shows software delay validation results for both iPad and Nexus 9 tests. Each row shows one test condition containing 200 measurements. The table shows data for the two largest clusters (Main and Secondary) which constitute almost all measurements. The right column shows the difference between the baseline and the Main cluster, which matches the expected value. Secondary clusters are one 60 Hz display frame slower.

Overhead Test

In an embodiment, the latency measuring device measures absolute levels of latency. An issue in calibrating these measurements is to understand the overhead of the measurement process. Several steps in the measurement process have small but finite durations (e.g., the time required for the ADC to read the photosensitive element's signal). In an embodiment, care is taken to ensure that these steps do not introduce an uncorrected delay that would skew the latency measurements. To measure this overhead, a device configuration was created that mimicked a zero-latency device by simply displaying a white screen, thus, the latency measuring device would detect a visual touch response as soon as it is able to check for one, and any reported non-zero latency would therefore entirely consist of measurement overhead.

In connection with an illustrative embodiment, twenty sample measurements revealed a consistent overhead of 0.006 ms (SD=0 ms), which is several orders of magnitude smaller than the quantities that are being measured. In an embodiment, measurement overhead that is several orders of magnitude smaller than the quantities that are being measured may be ignored. In an embodiment, measurement overhead that is several orders of magnitude smaller than the quantities that are being measuring may be accounted for in the latency measurements.

Measuring Latency in the Real-World

Figures 5, 6:
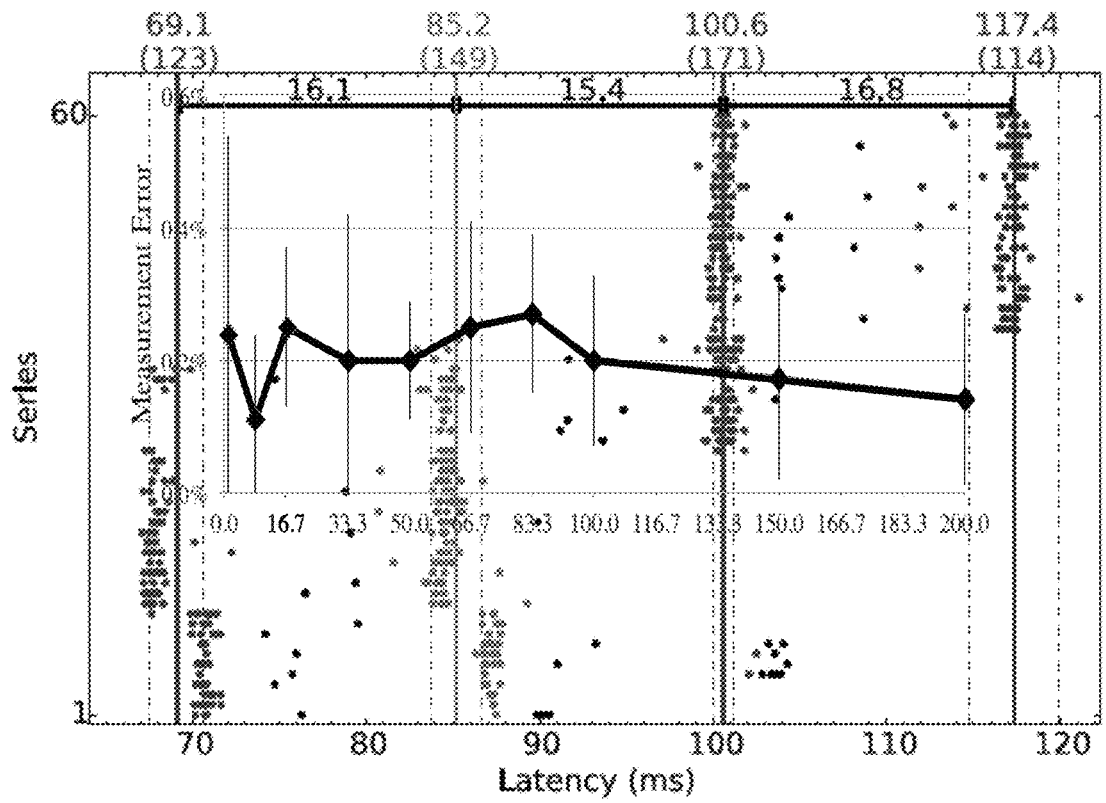
FIG. 5 shows a chart illustrating raw results of 600 latency measurements on a touchscreen smart phone.
FIG. 6 shows a table illustrating latency measurements for existing devices based on 500 measurements.

The same device can routinely exhibit a wide range of latencies, sometimes varying by as many as 3 frames (50 ms) between sequential samples, as exemplified in FIG. 5. FIG. 5 shows raw results of 600 latency measurements on a touchscreen smart phone, a Google Nexus 5 running Android 5.1.1. The device exhibits a latency profile that changes over time.

This phenomenon may not occur on specialized devices such as the demonstrator systems described previously in the literature, but it is evident and widespread on commercially-available devices.

Some of the observed factors impacting performance are: Heat. On many systems, as their internal temperature increases, the OS may choose to disable or throttle one or more CPU cores to reduce the thermal load. This effect is more pronounced on small devices (e.g., phones or tablets), since they often lack fans or other active thermal management technologies and thus have fewer options to cool themselves. The effect of thermal throttling during longer measurement runs on some devices were observed. For example, on the dataset from a Nexus 5 phone shown in FIG. 5, the initial sets of measurements were split between clusters at 69.1 and 85.2 ms. However, after approximately 300 measurements, an additional frame of latency would suddenly appear, and latency clusters at 100.6 and 117.4 ms were recorded. Allowing the phone to cool off (or briefly placing it in a freezer) would restore the faster performance. System Load. As one would expect, a busy OS handling a large number of processes will perform worse than a system that is idle. Reducing the number of background tasks (e.g., quitting other apps, disabling radios via Airplane mode, etc.) would often improve device latency.

Battery State. Similar to heat, throttling may occur if the device's battery level is low, and the OS switches off or throttles CPU cores in an attempt to save power.

Vertical Screen Refresh. As discussed above in the section on the direct optical latency measuring apparatus, most screens redraw from top to bottom. This redraw time is small, but can be on the order of ms. For example, it was observed that a Nexus 9 could take upwards of 10 ms to redraw its screen. This means that the location of the measurement head can have an impact, since the same redraw operation will appear to take less time if the screen response is measured at the top rather than the bottom of the screen. It may therefore be necessary to standardize a location (e.g., the center of the screen) for the measurement head. The measurements discussed herein were obtained from the center of the screen, a position we assume is centered in the redraw step.

Latency in general can be thought of as a range of possible values, rather than a single number. However, all of the above variables can be quantified, and can often be obtained programmatically by the measurement applications (e.g., querying the OS to determine the current power saving mode), thus adding context to the obtained measurements. Furthermore, the automation facilitated by the latency measuring device described herein allows consideration of latency within the context of the complexity of real-world devices in real-world conditions.

Various embodiments may be designed to meet various goals in accordance with the particular application. The following discussion presents examples of goals which may be useful for a particular embodiment, but, as would be understood by one of skill in the art in light of this disclosure, are not exhaustive or required to practice the techniques disclosed herein. These goals relate to precision and accuracy, range, flexibility, invasiveness, and automatic operation.

In an embodiment, with respect to precision and accuracy, given the lower bounds of latency perception, a measuring tool should be accurate and repeatable to within 1 ms. In an embodiment, with respect to range, some commercially available systems have latencies well over 100 ms, while some research-based systems have latencies of less than 1 ms. In an embodiment, a measuring tool should be able to report a wide range of latencies. In an embodiment, with respect to cost, the required equipment and infrastructure should be inexpensive, costing, for example, less than $100 USD. With respect to flexibility, in an embodiment, the tool should be able to measure any capacitive touchscreen device, regardless of size or platform. In an embodiment, with respect to invasiveness, the tool should be able to measure devices whether or not the tester has the ability to change or instrument the operating system, or even the ability to install application software on the device. In an embodiment, with respect to automatic operation, the tool should be capable of taking measurements without any human involvement after the initial setup and should be able to take a large number of unattended measurements within a short timespan in order to generate statistically significant results.

FIG. 6 shows a table illustrating latency measurements for existing devices based on 500 measurements. This table shows examples of latency measurements for commercial devices. The latency is reported for the two largest clusters characterized by their size. As in the table of FIG. 4, the two largest clusters of measurements are presented. Five hundred measurements were taken for each device. As discussed above, a number of factors can impact the latency of a device. While we have attempted to control for many of these (e.g., low temperature, low load, full battery), others, such as differences in software, are beyond our control. As such, it is important to understand that the data presented in FIG. 6, while accurate and representative, do not lend well to cross-device comparisons.

Throughout this disclosure, the terms "touch", "touches," "contact," "contacts", or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" that are hovering a distance above the touch surface or otherwise separated from the touch sensitive device. The use of language within this description that implies reliance upon sensed physical contact should not be taken to mean that the techniques described apply only to those embodiments; indeed, generally, what is described herein would apply equally to "contact" and "hover" sensors, each of which being a "touch" as that term is used herein. More generally, as used herein, the term "touch" refers to an act that can be detected by the types of touchscreens disclosed herein.

The present systems and methods are described above with reference to computing devices and microcontrollers devices. It is understood that such computing devices and microcontrollers may be implemented by means of analog or digital hardware and computer program instructions. In this respect, computer program instructions may be provided to a processor of a general purpose computer, special purpose computer, FPGA, ASIC, SoC, or other programmable data processing apparatus, such that the instructions, which execute via a processor of a computer or other programmable data processing apparatus. Except as expressly limited by the discussion above, in some alternate implementations, the functions/acts noted in the blocks may occur out of the order noted in the operational illustrations.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device. Functions expressed in the claims may be performed by a processor in combination with memory storing code and should not be interpreted as means-plus-function limitations.

Routines executed to implement the embodiments above may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). Such computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including but not limited to ROM, volatile RAM, non-volatile memory and/or cache. Portions of this software and/or data may be stored in any one of these storage devices. As would be understood by one of ordinary skill in the art in view of this disclosure, the aforementioned list of potential storage places for the executable software or data, or portions thereof, is not exhaustive and is not limited to the locations listed in the aforementioned example. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.)

In various embodiments, hardwired circuitry may be used in combination with software instructions to implement the techniques. Thus, the techniques are neither limited to any specific combination of hardware circuitry and software nor to any particular source for the instructions executed by the data processing system.

As used herein, and especially within the claims, ordinal terms such as first and second are not intended, in and of themselves, to imply sequence, time or uniqueness, but rather are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic.

While the invention has been particularly shown and described with reference to a preferred embodiment thereof, it will be understood by those skilled in the art that various changes in form and details may be made therein without departing from the spirit and scope of the invention.

What is claimed is:

1. A latency measuring head for use in measuring touch-to-response latency in a test device, the test device including a capacitive user interface that responds to touch input, the latency measuring head comprising:
   a conductive element adapted to be positioned in a first fixed proximity to the capacitive user interface, which the first fixed proximity may include being in contact with the capacitive user interface;
   an electron sink operatively connected to the conductive element via a normally open switch having an open and a closed position, the electron sink being adapted to cause dissipation of sufficient charge to trigger a touch event on the test device in response to the switch being closed; and
   a photosensitive element adapted to be positioned in a second fixed proximity to the capacitive user interface, which the second fixed proximity may include being in contact with the capacitive user interface, the photosensitive element being further adapted to output signals corresponding to at least one optical property of at least a portion of the capacitive user interface.

2. The latency measuring head according to claim 1, further comprising a microcontroller adapted to close the normally open switch.

3. The latency measuring head according to claim 2, wherein the microcontroller is further adapted to measure a time period from a time at which the normally open switch is closed to a time when there is a change in an optical property of at least a portion of the capacitive user interface.

4. The latency measuring head according to claim 2, wherein the microcontroller is further adapted to:
 a. identify a first time, the first time corresponding to a time at which the normally open switch is closed;
 b. receive the signals corresponding to at least one optical property;
 c. identify a second time, the second time corresponding to a time at which there is a predetermined change in the received signals; and,
 d. use the first time and the second time to compute end-to-end latency of the test device.

5. The latency measuring head according to claim 2, wherein the microcontroller is under control of a host computer.

6. The latency measuring head according to claim 1, wherein the latency measuring head is under control of a host computer.

7. The latency measuring head according to claim 6, wherein the latency measuring head is further adapted to communicate with the host computer so as to enable the host computer to:
 a. identify a first time, the first time corresponding to a time at which the normally open switch is closed;
 b. receive the signals corresponding to at least one optical property;
 c. identify a second time, the second time corresponding to a time at which there is a predetermined change in the received signals; and,
 d. use the first time and the second time to compute end-to-end latency of the test device.

8. The latency measuring head according to claim 1, wherein the conductive element comprises a conductive material.

9. The latency measuring head according to claim 1, wherein the conductive element comprises at least one material selected from the group: brass, aluminum, bronze, iron, steel, nickel, tin, silver, gold, platinum, carbon, conductive plastics, indium tin oxide, or a material with a high dielectric.

10. The latency measuring head according to claim 1, wherein the photosensitive element is adapted to output signals corresponding to at least one optical property on only a portion of the capacitive user interface.

11. The latency measuring head according to claim 1, wherein the photosensitive element is adapted to output signals corresponding to at least one optical property at any location on the capacitive user interface.

12. The latency measuring head according to claim 4, wherein the photosensitive element comprises a photodiode and wherein the predetermined change in the received signals is a predetermined change in brightness.

13. The latency measuring head according to claim 1, wherein the photosensitive element comprises at least one device selected from the group: photodiode, camera, photoresistor, phototransistor, charge-coupled device (CCD), or complementary metal-oxide-semiconductor (CMOS).

14. The latency measuring head according to claim 1, wherein the conductive element and the photosensitive element are in a single housing.

15. The latency measuring head according to claim 1, wherein the conductive element and the photosensitive element are each in separate housings.

16. The latency measuring head according to claim 2, wherein the microcontroller is adapted to perform unattended batch collection of latency measurements of the test device.

17. The latency measuring head according to claim 16, wherein the microcontroller is adapted to perform unattended successive determinations of latency of the test device.

18. The latency measuring head according to claim 2, wherein the microcontroller is adapted to estimate a time from touch activation to display of a corresponding visual response.

19. The latency measuring head according to claim 18, wherein the estimation is based upon at least one timestamp generated external to the test device.

20. The latency measuring head according to claim 1, further comprising a fixture adapted to bias a surface of the measurement head towards contact with a screen of the test device.

21. The latency measuring head according to claim 20, wherein the fixture comprises at least one selected from the group: repositionable weight, repositionable clamp, strap, magnet, suction cup, vacuum, or adhesive.

22. The latency measuring head according to claim 1, adapted to operate with a custom application running on the test device.

23. The latency measuring head according to claim 1, adapted to operate without a custom application running on the test device.

24. The latency measuring head according to claim 22, wherein the custom application is configured to display on the test device a first screen with a region having an optical property at a first level in the absence of a touch event and to display on the test device a second screen wherein the region displays the optical property at a second level in response to a touch event.

25. The latency measuring head according to claim 1, wherein the normally open switch comprises an electrically actuated switch, and the latency measuring head is adapted to initiate latency measurement without human contact with any portion of the latency measuring head.

26. The latency measuring head according to claim 1, wherein the switch comprises an electrically actuated switch and the latency measuring head is adapted to initiate latency measurement without contact or interaction with a host computer.

27. The latency measuring head according to claim 2, wherein the normally open switch is a switch selected from the group: highly insulated mechanical relay, transistor, diode, analog switch, MEMS switch, or low-capacitance switch.

28. The latency measuring head according to claim 26, wherein the normally open switch is a switch selected from the group: highly insulated mechanical relay, transistor, diode, analog switch, MEMS switch, or low-capacitance switch.

29. The latency measuring head according to claim 1, wherein the optical property is at least one optical property selected from the group: brightness, contrast, color, or luminance.

30. The latency measuring head according to claim 1, further adapted to measure a time period from a time at which the normally open switch is closed to a time when there is a change in an optical property of at least a portion of the capacitive user interface.

31. The latency measuring head according to claim 1, further adapted to perform unattended batch collection of latency measurements of the test device.

32. The latency measuring head according to claim 30, further adapted to perform a plurality of unattended batch collections of latency measurements.

33. The latency measuring head according to claim 1, further adapted to comprise a full or partial user interface.

34. The latency measuring head according to claim 1, further adapted to estimate a time from touch activation to display of a corresponding visual response.

35. The latency measuring head according to claim 33, wherein the estimation is based upon at least one timestamp generated external to the test device.

36. The latency measuring head according to claim 1, wherein the first fixed proximity and the second fixed proximity are different.

37. The latency measuring head according to claim 1, wherein the first fixed proximity and the second fixed proximity are the same.

* * * * *